April 24, 1934. F. W. PETERS 1,955,860
SEALING MEANS
Filed Jan. 13, 1933

Inventor
Frederick W. Peters,
By Hull, Brock & West,
Attorneys

Patented Apr. 24, 1934

1,955,860

UNITED STATES PATENT OFFICE 1,955,860

SEALING MEANS

Frederick W. Peters, Cleveland, Ohio

Application January 13, 1933, Serial No. 651,643

3 Claims. (Cl. 286—7)

This invention relates generally to means for sealing against leakage shafts such as are employed with pumps or compressors, wherein the shaft passes through a wall subjected to different pressures on opposite sides thereof.

The general purpose and object of the invention is to provide for such shafts sealing means which will be extremely efficient in preventing fluid, subjected to pressure, from leaking from the high-pressure side of the wall to the low-pressure side thereof.

A further object of the invention is to provide sealing means of the character referred to which are simple in construction, economical of production, and which, while being efficient in operation, are capable of production at comparatively low cost, as well as capable of quick and ready installation.

Further and more limited objects of the invention will appear in the detailed description hereof and will be clearly understood by those skilled in the art to which this invention relates.

Figure 1:
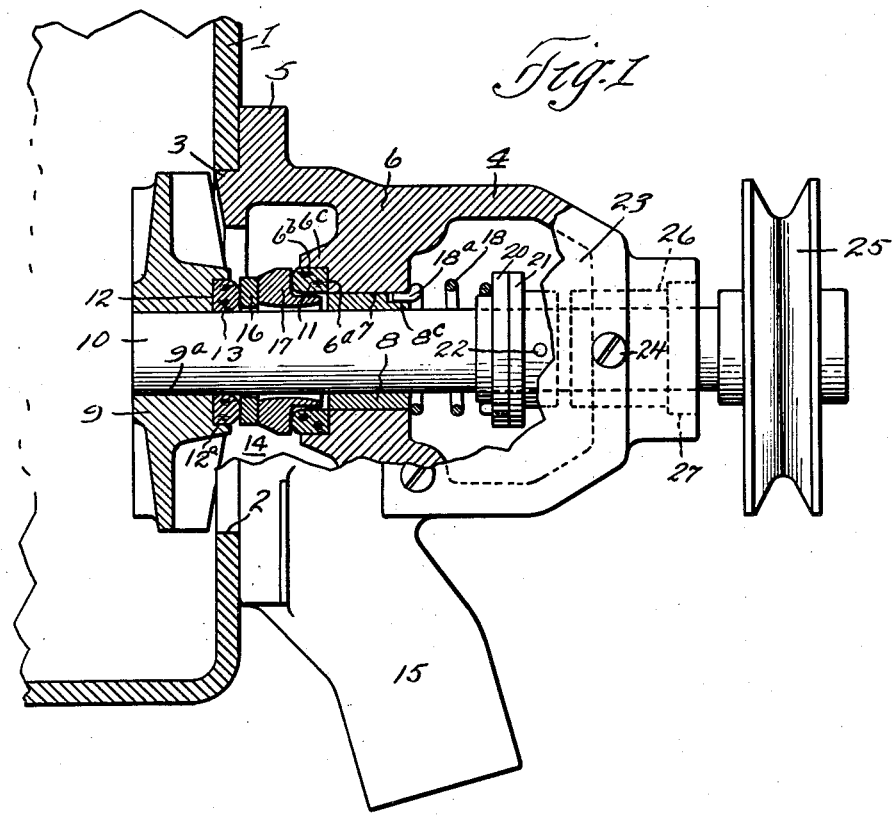
Figure 2:
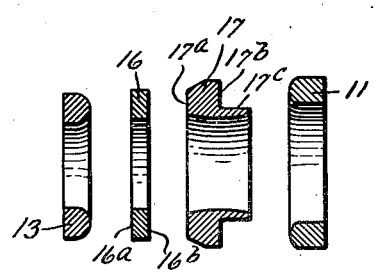

Referring to the drawing, Fig. 1 represents a sectional elevation of a pump employing my invention and showing the same attached to a fluid-containing receptacle in which the impeller operates; and Fig. 2 is a detail in section showing the sealing members.

Describing the various parts by reference characters, 1 represents one of the walls of a chamber within which the impeller is adapted to operate, which chamber may be provided within the cylinder block of an engine and constitute part of the water-circulation system, the said chamber being provided with an opening 2 in one of the side walls thereof which is adapted to permit the passage of the impeller therethough and to have fitted therewithin an annular shoulder 3 on the inner end of a casing 4, the said casing having a flange 5 which is adapted to engage the wall 1 surrounding the opening 2 and by means of which flange the casing and the parts associated therewith may be secured to the said wall, as by means of bolts (not shown).

The casing 4 is provided with a radially inwardly projecting wall 6 having a cylindrical opening 7 therethrough providing an elongated bearing for the bushing 8, the said bushing being made of bronze and preferably of the particular type of oil impregnated bronze known as "Oilite". The bushing extends throughout the length of the bearing 7, and the wall 6 is provided, beyond said bearing, with an annular surface $6a$ extending radially outwardly from the end of the bearing bore which is adjacent to the impeller 9 on one end of the shaft 10; also with a cylindrical surface $6b$ extending from the outer edge of the annular surface $6a$ toward the impeller and provided within an extension $6c$ of the wall 6. Within the chamber formed by the walls $6a$ and $6b$ there is inserted a ring 11 of compressible material, preferably cork, the said ring being normally of greater external diameter than the diameter of the cylindrical surface $6b$, whereby the ring will be held under radial compression within said chamber.

12 denotes an annular recess formed within the hub of the impeller, the recess extending outwardly from the central bore $9a$ of said hub. Within this recess there is inserted a ring 13 of compressible material preferably cork, the external diameter of which is normally greater than the diameter of the cylindrical surface $12a$ of the recess, whereby the ring is held under radial compression betwen the shaft 10 and the cylindrical wall $12a$, the ring projecting into the space 14 which receives water or other fluid forced by the impeller through the said space and through the outlet connection 15. The cork of which the ring 12 is composed may be ordinary cork or a composition including cork in a ground condition, such as is frequently used for packing purposes. The casing 1, as stated hereinbefore, may be part of the cylinder block of an engine, and the outlet connection 15 may be used to deliver water from said cylinder block to the radiator of an automobile.

Interposed between the rings 11 and 13 are two rings, each being of greater internal diameter than the diameter of the shaft 10, whereby they may have a floating movement with respect to said shaft. One of these rings is indicated at 16 and has opposed parallel annular surfaces $16a$ and $16b$ extending radially outwardly from the bore thereof, the former surface engaging the adjacent end of the ring 12 and the latter surface engaging a radially outwardly extending annular surface $17a$ on the other of the two rings, indicated at 17. The ring 17 is of bronze and preferably of bronze known to the trade as "Oilite" bronze. The ring 17 also has a radially outwardly extending annular surface $17b$, parallel with the surface $17a$, and engaging the adjacent end of the ring 11; it also has a sleeve $17c$ which extends between the inner surface of the ring 11 and the shaft 10, there being a clearance provided between the inner and outer surfaces of said sleeve and the surface of the shaft 10 and the inner surface of the ring 11, respectively. The ring 16 is preferably of hardened steel.

The cooperating surfaces of the rings 11, 13, 16 and 17 are held in engagement with one another by means of a spring 18 which is located in a lubricant chamber 19 in the casing 4, one end of the spring bearing against the adjacent end of the wall 6 and having at such end a pin $18a$ which enters a hole $8c$ in the bushing 8. The opposite end of the spring bears against one member 20 of a compound thrust washer, the member 20 being preferably of bronze and being backed by a member 21, which is preferably of steel and which is secured to the shaft 10 as by means of a pin 22.

The lubricant chamber of the casing is provided with a cover 23 which is removably secured to the casing, as by means of screws 24. The end of the shaft 10 which is remote from the impeller is shown as provided with a driving pulley 25, and the portion of the shaft adjacent to said pulley extends through a bearing at the end of the casing adjacent to such pulley, the bearing being provided with a bushing 26 having a running fit on the shaft, there being a lubricant retainer 27 in the end of the casing beyond the said bushing.

Due to the floating action of the rings 16 and 17 and to the compressibility of the rings 11 and 13, the sealing members constituted by the rings 11, 13, 16 and 17 are adapted to accommodate themselves automatically to any misalignment of the shaft or bearings as well as to any wear of the bearings, thereby to preserve a leak-proof seal at all times, preventing the passage of fluid beyond said rings and the wall 6.

Having thus described my invention, what I claim is:

1. The combination, with a shaft, of a member secured to one end of said shaft for rotation therewith, a wall through which such end of said shaft extends, and sealing means for the portion of the shaft between the said wall and the said member, the said means including a bearing in the said wall through which the shaft extends, a bushing within said bearing and having a running fit on said shaft, the said wall having a recess extending radially outwardly from the end of the bearing therein which is presented toward said rotating member, the said recess having a radially outwardly extending annular wall and a cylindrical wall extending toward the rotating member from the outer end of said annular wall, a ring of compressible material in the said recess and having an end thereof projecting beyond the said recess toward the said rotating member, said rotating member having in the side thereof which is presented toward the said wall an annular recess surrounding said shaft, a ring of compressible material in said recess, a ring on said shaft and having a greater internal diameter than the diameter of said shaft and having opposed parallel radially outwardly extending annular surfaces, one of which is adapted to engage the adjacent end of the second ring, a fourth ring interposed between the third ring and the first ring and having a greater internal diameter than the diameter of said shaft, the fourth ring having a radially outwardly extending annular surface adapted to engage the adjacent surface of the third ring and a radially outwardly extending surface adapted to engage the adjacent surface of the first ring, and means for pressing the cooperating surfaces of the said rings into engagement with one another.

2. The combination, with a shaft, of a member secured to one end of said shaft for rotation therewith, a wall through which such end of said shaft extends, and sealing means for the portion of the shaft between the said wall and the said member, the said means including a bearing in the said wall through which the shaft extends, a bushing within said bearing and having a running fit on said shaft, the said wall having a recess extending radially outwardly from the end of the bearing therein which is presented toward said rotating member, the said recess having a radially outwardly extending annular wall and a cylindrical wall extending toward the rotating member from the outer end of said annular wall, a ring of compressible material in the said recess and having an end thereof projecting beyond the said recess toward the said rotating member, said rotating member having in the side thereof which is presented toward the said wall an annular recess surrounding said shaft, a ring of compressible material in said recess, a ring on said shaft and having a greater internal diameter than the diameter of said shaft and having opposed parallel radially outwardly extending annular surfaces, one of which is adapted to engage the adjacent end of the second ring, a fourth ring interposed between the third ring and the first ring and having a greater internal diameter than the diameter of said shaft, the third ring having a radially outwardly extending annular surface adapted to engage the adjacent surface of the third ring and a radially outwardly extending surface adapted to engage the adjacent surface of the first ring, the fourth ring being provided with a sleeve which is interposed between the inner wall of the first ring and the shaft, and means for pressing the cooperating surfaces on the said rings into engagement with one another.

3. The combination, with a shaft, of a member secured to one end of said shaft for rotation therewith, a wall through which such end of said shaft extends, and sealing means for the portion of the shaft between the said wall and the said member, the said means including a bearing in the said wall through which the shaft extends, a bushing within said bearing and having a running fit on said shaft, the said wall having a recess extending radially outwardly from the end of the bearing therein which is presented toward said rotating member, the said recess having a radially outwardly extending annular wall and a cylindrical wall extending toward the rotating member from the outer end of said annular wall, a ring of compressible material in the said recess and of normally greater external diameter than said recess and having an end thereof projecting beyond the said recess toward the said rotating member, said rotating member having in the side thereof which is presented toward the said wall an annular recess extending outwardly from said shaft, a ring of compressible material in said recess and of normally greater external diameter than said recess, a ring on said shaft and having a greater internal diameter than the diameter of said shaft and having opposed parallel radially outwardly extending annular surfaces, one of which is adapted to engage the adjacent end of the second ring, a fourth ring interposed between the third ring and the first ring and having a greater internal diameter than the diameter of said shaft, the third ring having a radially outwardly extending annular surface adapted to engage the adjacent surface of the third ring and a radially outwardly extending surface adapted to engage the adjacent surface of the first ring, the fourth ring being provided with a sleeve which is interposed between the inner wall of the first ring and the shaft, and means for pressing the cooperating surfaces of the said rings into engagement with one another, the third ring being made of steel and the fourth ring being made of bronze.

FREDERICK W. PETERS.